A. F. H. HEAD.
CAR TRUCK.
APPLICATION FILED NOV. 2, 1910.
1,096,366.
Patented May 12, 1914.
7 SHEETS—SHEET 1.
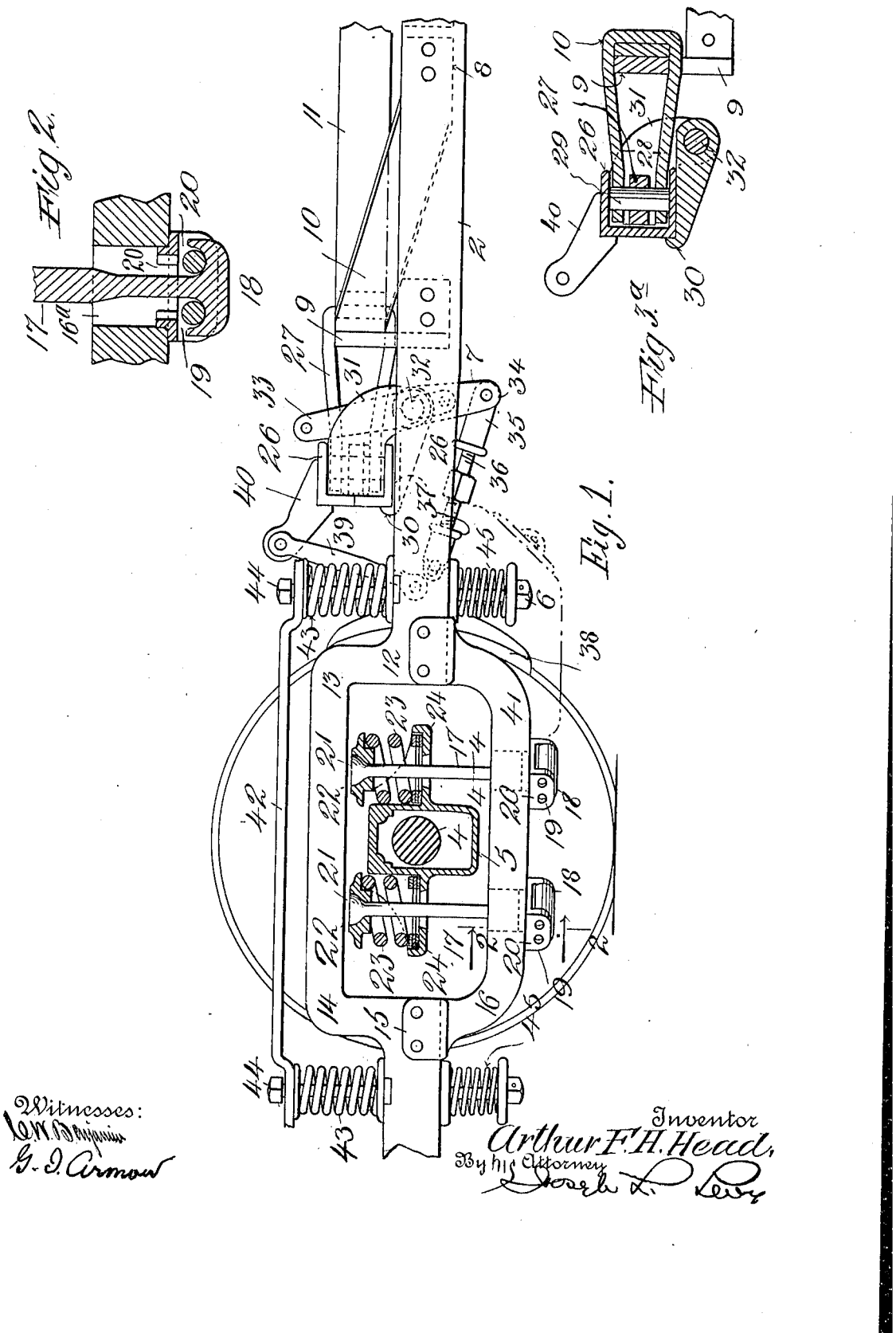
Witnesses:
Inventor
Arthur F. H. Head,
By his Attorney

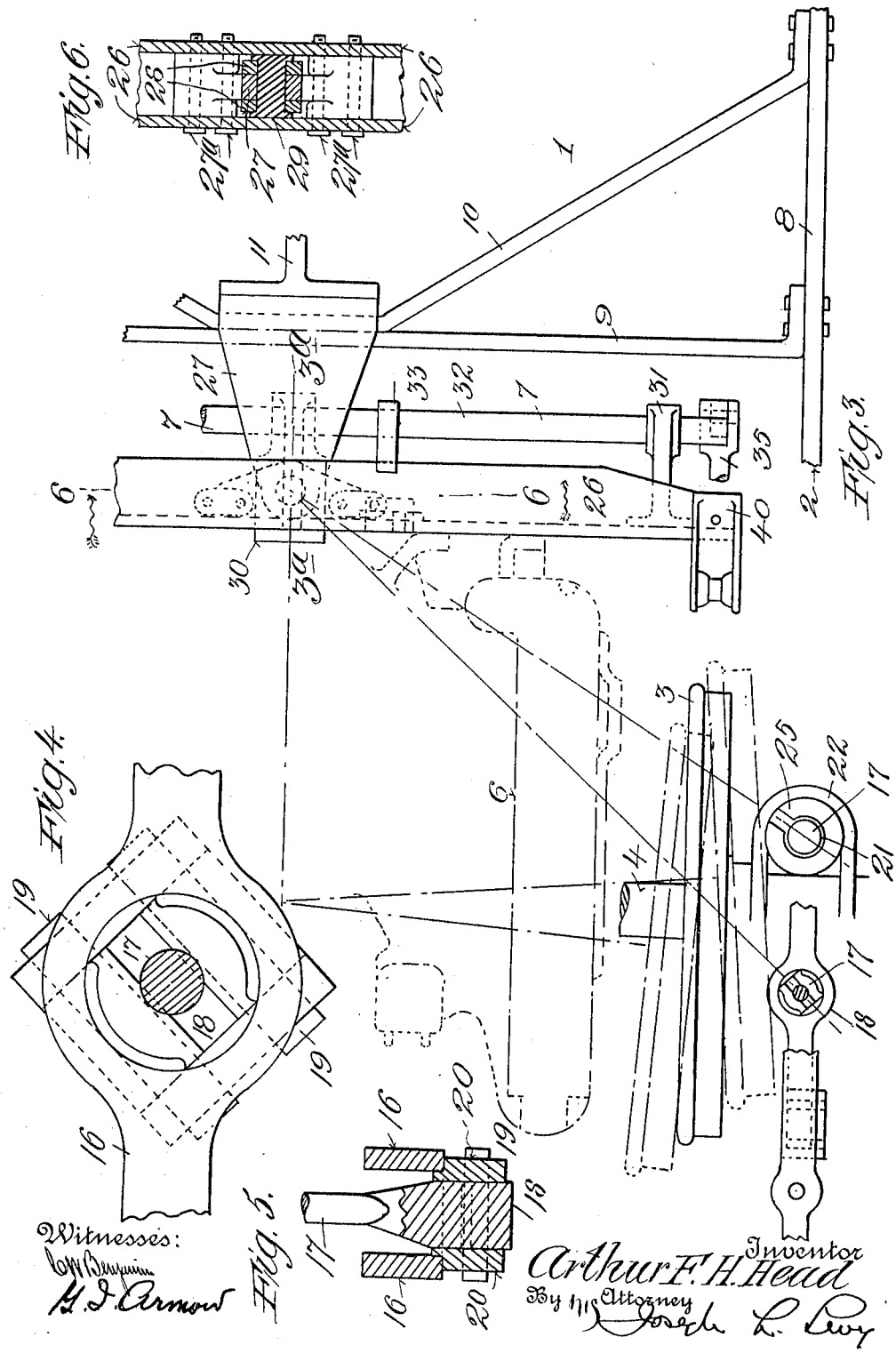

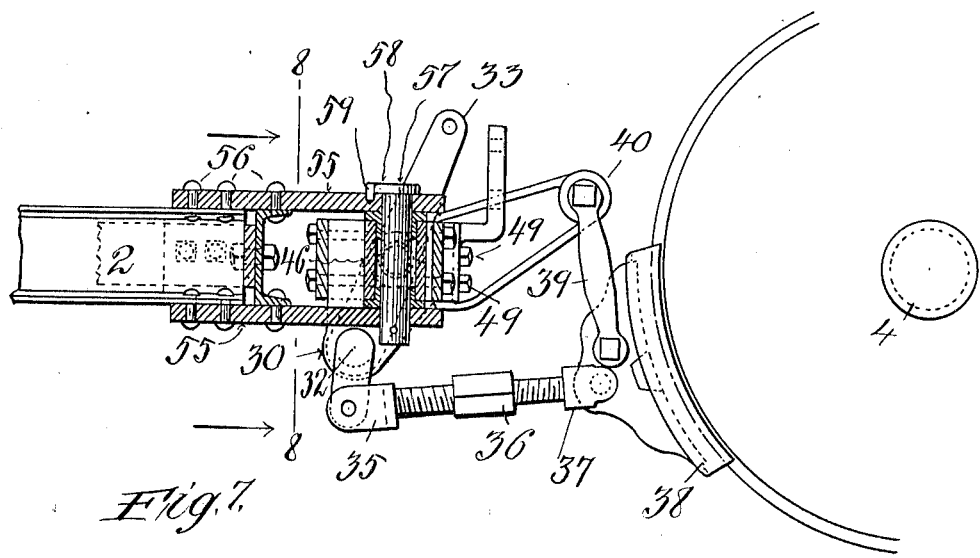
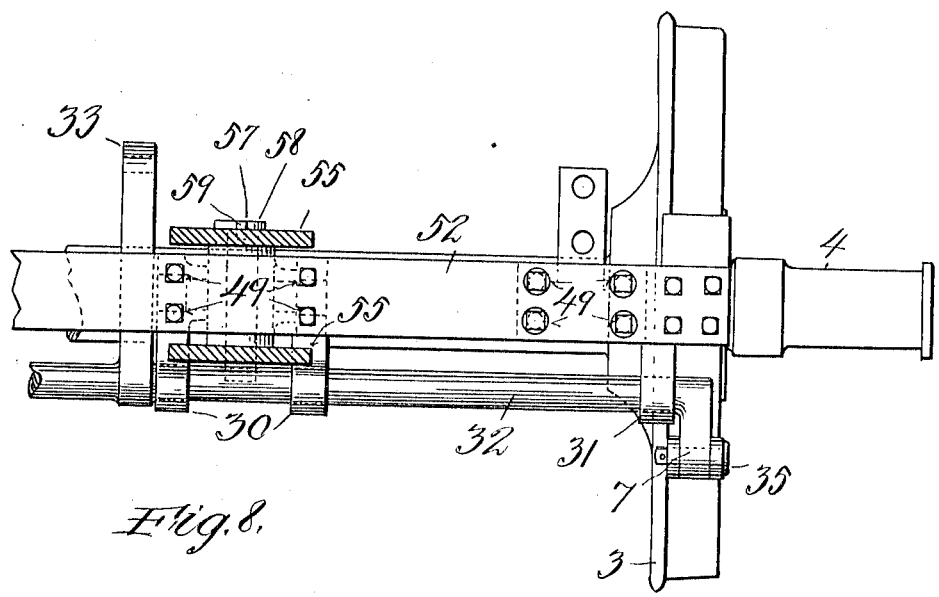

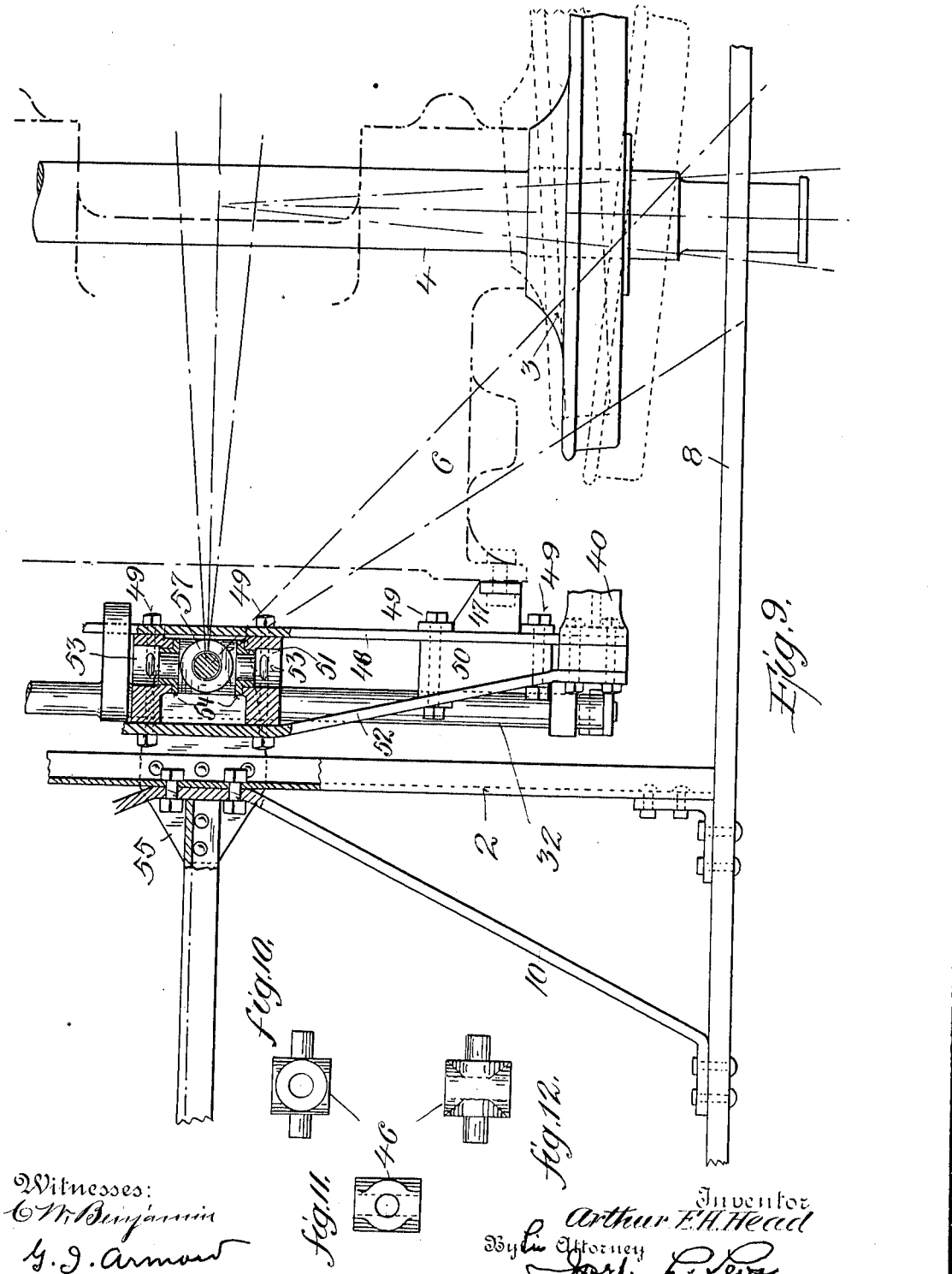

A. F. H. HEAD.
CAR TRUCK.
APPLICATION FILED NOV. 2, 1910.
1,096,366.
Patented May 12, 1914.
7 SHEETS—SHEET 5.
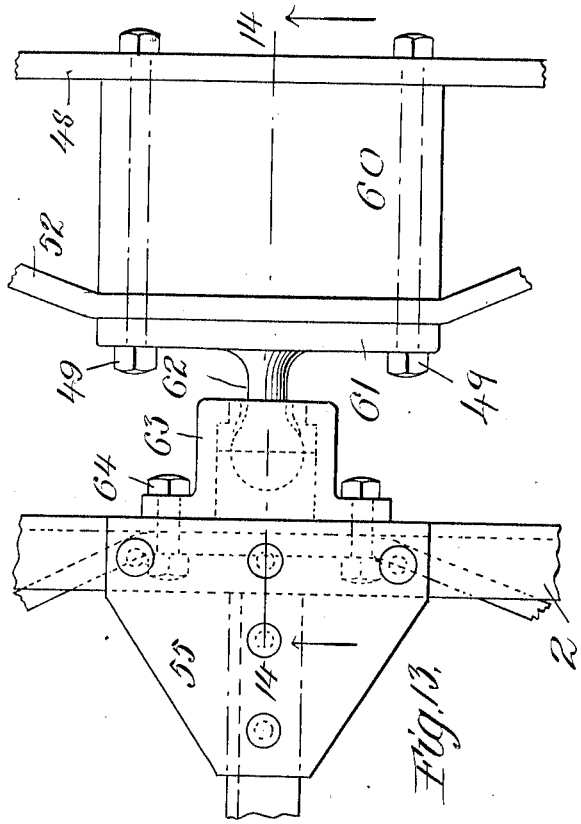
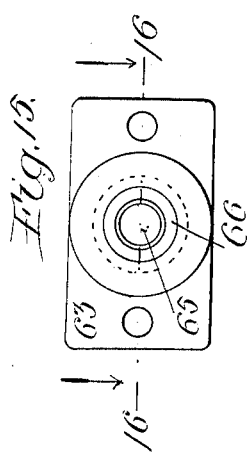
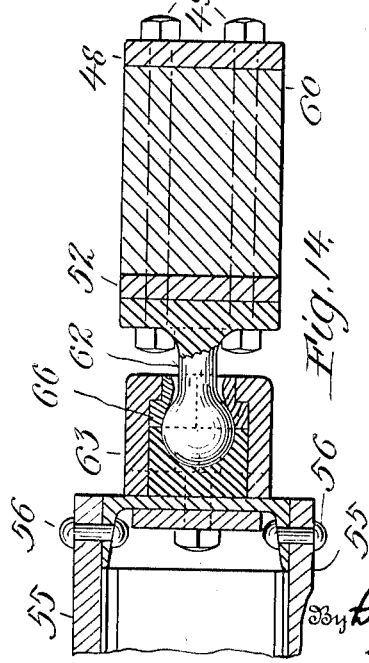
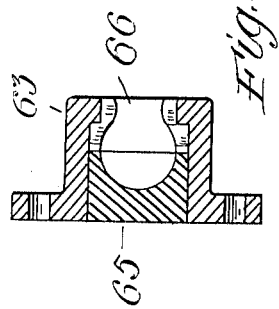
Witnesses:
C. W. Benjamin
G. D. Armour
Inventor
Arthur F. H. Head
By his Attorney
Joseph L. Levy

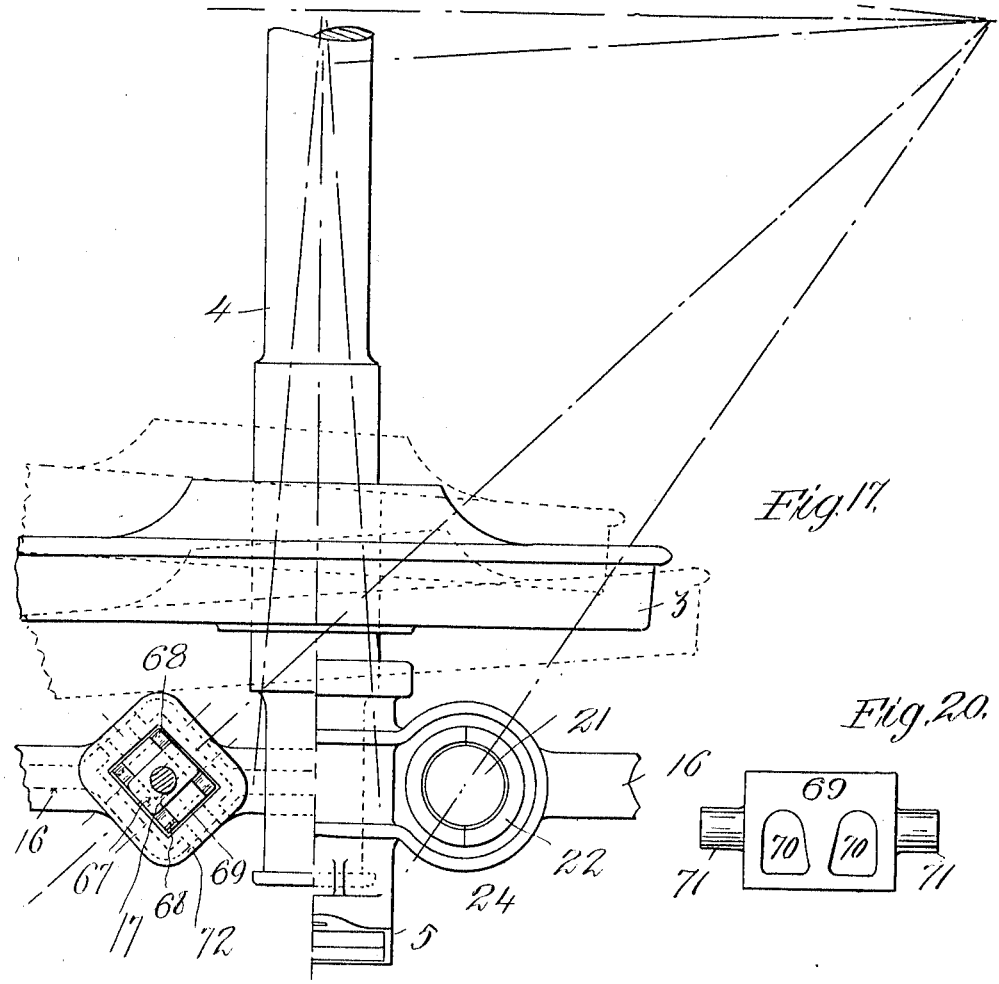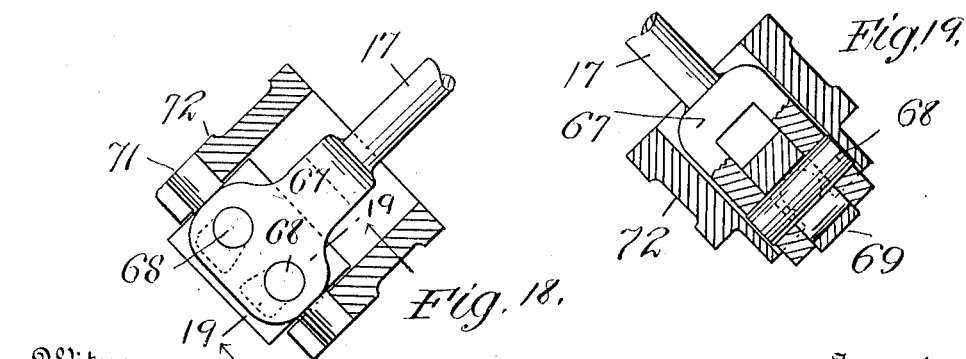

A. F. H. HEAD.
CAR TRUCK.
APPLICATION FILED NOV. 2, 1910.

1,096,366.

Patented May 12, 1914.
7 SHEETS—SHEET 7.

Witnesses:
E. W. Benjamin
G. I. Armour

Inventor
Arthur F. H. Head.
By his Attorney
Joseph L. Levy

UNITED STATES PATENT OFFICE.

ARTHUR F. H. HEAD, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,096,366. Specification of Letters Patent. Patented May 12, 1914.

Application filed November 2, 1910. Serial No. 590,312.

*To all whom it may concern:*

Be it known that I, ARTHUR F. H. HEAD, a subject of the King of Great Britain, and a resident of Philadelphia, county of Philadelphia, and State of Pennsylvania, have invented certain new and useful Improvements in Car-Trucks, of which the following is a specification.

The object of the invention is to provide a truck in which the axles may have a radial movement in going around curves and at the same time to provide a truck in which there will be no oscillation or vibration either on a straight or curved track. Heretofore radial trucks have been made so that while the axles could radiate there was also a tendency of the truck frame to oscillate in a very objectionable manner when running on a straight track, also to a small extent, on curves.

In the embodiments of my invention hereinafter set forth, the desirable feature of permitting a radiation of the axles is retained, while at the same time all oscillation of the truck frame is prevented, so that my improved truck has the advantage of the ordinary non-radiating truck when running on a straight track and of a radiating truck when running on a curved track.

With Walter S. Adams, I have filed an application for Letters Patent for improvements in radial axle trucks, Serial Number 581,382, filed September 10th, 1910, on which the hereinafter described devices are improvements, and I have shown and described the structure of that application herein to more clearly define my present improvements.

For a more particular description of the present invention, reference is to be had to the accompanying drawings forming a part hereof, and the appended claims.

Figure 21:
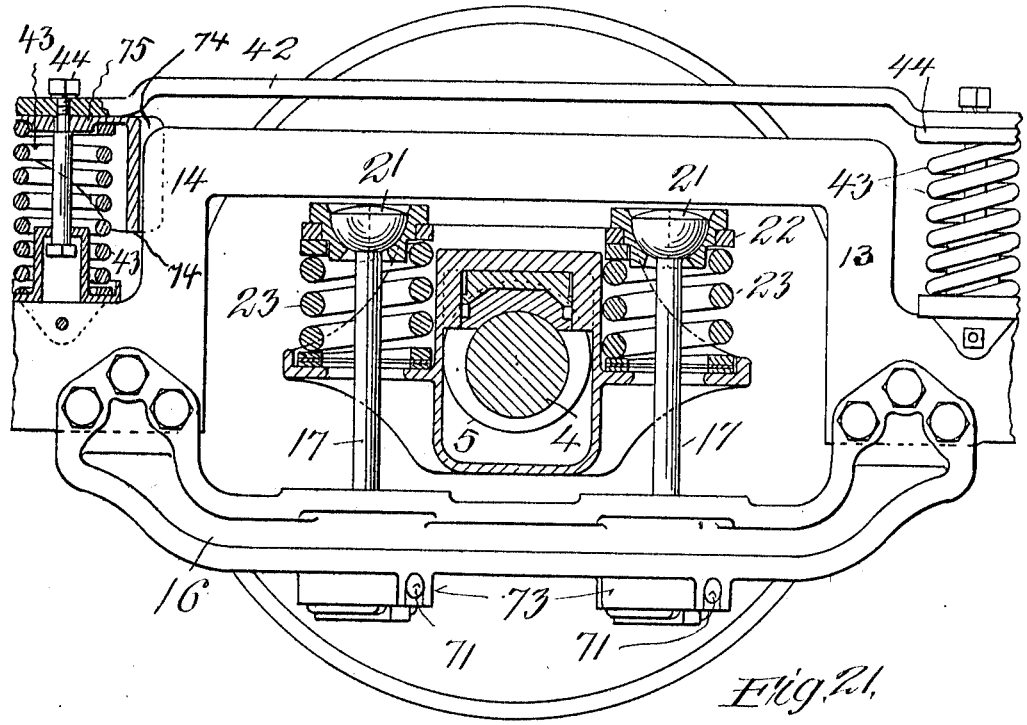
Figure 22:
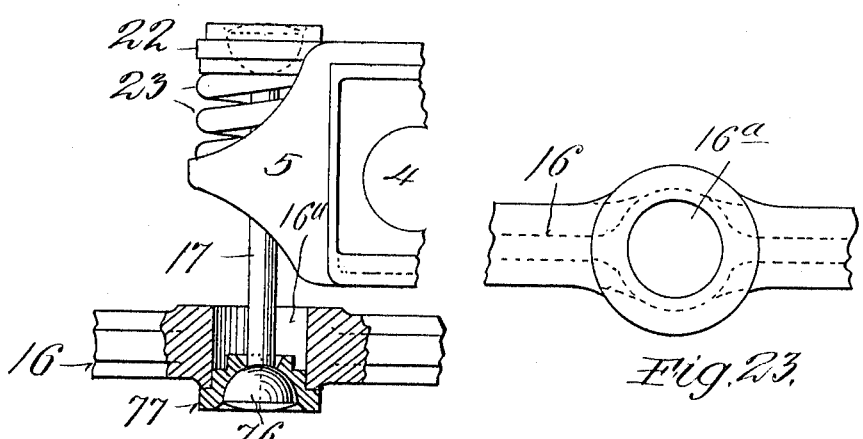
Figure 23:
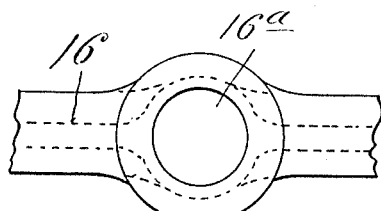
Figure 24:
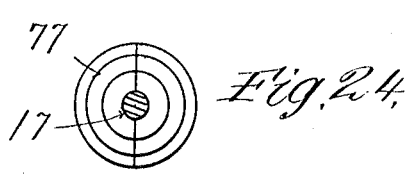

In the drawings:—Figure 1 is a side elevation, partially in section, of a truck embodying my improvements. Fig. 2 is a sectional view taken on the line 2—2 of Fig. 1, looking in the direction of the arrows. Fig. 3 is a plan view of a portion of a truck provided with my improvements. Fig. 3ª is a sectional view taken on the line 3ª—3ª of Fig. 3, looking in the direction of the arrows. Fig. 4 is a sectional plan view, taken on the line 4—4 of Fig. 1. Fig. 5 is a sectional view of the lower end of a spring post. Fig. 6 is a sectional view taken on the line 6—6 of Fig. 3 looking in the direction of the arrows. The foregoing figures relate to the structure shown in my joint application above referred to. Fig. 7 is a sectional view of a structure with a modified king-bolt construction. Fig. 8 is a sectional view taken on the line 8—8 of Fig. 7, looking in the direction of the arrows. Fig. 9 is a plan view of a portion of a truck shown in Figs. 7 and 8. Figs. 10, 11 and 12 are plan, end and side views respectively of the modified form of king bolt shown in Figs. 7 to 9 inclusive. Figs. 13, 14, 15 and 16 show a universal joint instead of a king bolt; and parts of the truck adjacent thereto, Fig. 13 being a plan view, Fig. 14 a sectional view on the line 14—14, of Fig. 13, looking in the direction of the arrows, Fig. 15 is a plan view of a socket, and Fig. 16 is a sectional view taken on the line 16—16 of Fig. 15, looking in the direction of the arrows. Fig. 17 is a plan view, partially in section, showing a modified form of spring post. Figs. 18, 19 and 20 are detailed views showing the lower end of the spring post, Fig. 19 being a sectional view on the line 19—19 of Fig. 18, looking in the direction of the arrows, and Fig. 20, showing the bearing block secured in the end of the post. Fig. 21 is a side elevation, partially in section, of a slightly modified form of my invention. Figs. 22, 23 and 24 are detailed views showing a further modification of the spring post and its connecting parts, Fig. 23 showing a portion of a yoke to which the spring post is connected through the socket shown in Fig. 24.

Throughout the various views of the drawings, similar reference characters designate similar parts.

The improved truck 1 comprises a frame 2, wheels 3, axles 4, axle boxes 5, motor casing 6, brake mechanism 7 and connecting parts.

The frame 2 may be of any suitable construction and preferably consists of side bars 8 (one on each side) united by crossings 9 and braces 10 and suitable reinforce 11 which may extend to another crossing the same as 9 and 10 the structure for one axle and set of wheels only being shown, it being understood that the parts are duplicated for each set of wheels.

The side frames 8 are upwardly bent at 12 and then extend horizontally at 13 and are finally bent down at 14 to form yokes, and then bent outwardly to form a continuation of the frame 8. A yoke-brace 16 supplements the parts 12, 13 and 14 and 15 as shown, and is fixed to the side frame 8 below the yoke by bolts or other suitable means.

The yoke brace 16 contains two parallel perforations 16ᵃ through which extend box spring-posts 17. Each box spring-post 17 has a suitable T head 18 which engages suitable pins 19 that have their ends resting in a suitable saddle 20 that rests against the under side of the yoke brace 16. The upper ends of the posts 17 are preferably formed with spherical heads 21 that are seated in and fit caps 22 forming a universal joint. The caps 22 rest on coiled springs 23, the lower ends of which rest on ears 24 that extend laterally from the axle boxes 5. The pins 19 and saddles 20 are set according to a rule which will be given below. The caps 22 are slotted at 25 to permit removal without breaking the posts 17.

The wheels 3 are fixed on the axles 4 in the conventional manner and the axles may be journaled in the axle boxes 5 in the usual way, so that a detailed description is unnecessary.

The motor casing 6 is sleeved on the axle 4, as usual, but is connected with the truck at a point of support, so as to coöperate therewith and form an element therein. This casing 6 is of the conventional form so that it is unnecessary to describe it further than to say that it is connected to the truck and supports the brake rigging in a manner which will be described below. The motor casing is fixed to two motor and brake supporting angles 26 which have their vertical webs running in opposite directions and their horizontal webs separated by the thickness of the king bolt holder 27. The bars 26 are secured together by bolts, screws or other suitable means, and the king-bolt holder 27 is secured to the bars 26 by suitable pins 27ᵃ that engage the walls of suitable perforations.

The king bolt holder 27 is interposed between the angles 26, and also has a portion extending between the ends of the king bolt pivot yoke 28 which is fixed to the crossing 9 and 10 held between the crossing 10 and bar 11 by bolts or other suitable means. The king bolt 29 passes through this yoke through the king bolt holder so that the axle 4 swings on the king bolt 29 as a center. The pins 19 are so set that their axes, when projected, run under or substantially under the king bolt 29, so that when the axle 4 radiates, one side of the T head 18 disengages a pin 19 and rests on the other pin and at the same time one side of each spring 23 is correspondingly depressed. This construction tends to and does restore the axle 4 to its normal position when the curve is passed, and prevents undue swinging of the box spring posts 17.

The angles 26 also support the brake rigging 7 through a central bracket 30 and supports 31, all of which are suitable brackets, the bracket 30 being secured under the lower angle 26 by bolts or screws, or other suitable means and the brackets 31 to the vertical webs of the angles 26. These brackets 30 and 31 carry a suitable brake shaft 32 to which is fixed an actuating lever 33 a little to one side of its center, and at its ends are fixed the downwardly depending cranks 34 which are connected to suitable brake rods 35 which engage suitable screws 36 which screws also engage other brake rods 37 and these rods 37 engage the brake shoe holder 38 in the conventional manner. The screw 36 is preferably a right and left screw, so as to permit adjustment of the rod as to length to compensate for wear. The brake shoe holder 38 is suspended by a suitable hanger 39 which is suitably supported in a bracket 40 on the upper surface of the upper bar 26 so that the brake shoe 41 can be thrown against the wheel 3 in the conventional manner. The upper end of the lever 33 is connected to the usual rods and other mechanism for controlling the brake.

The embodiment of the invention in the foregoing description is applicable either to a pivoted or a fixed truck, i. e., a truck pivoted to a car body or fixed to a car body. It is more particularly adapted to the non-pivotal truck where the wheel base is much longer and then the car body is preferably carried by a top cord 42 on suitable coiled springs 43 and guided by bolts 44 which also pass through coiled springs 45 below the side frame 8.

It will be noted that neither a sub-truck frame nor any equivalent therefor is provided. That the axle boxes are connected directly to the truck frame 2 through the springs 23, caps 22, posts 17, head 18, pins 19, seats 20. That the radiation of the axles 4 is regulated by the motor casing 6 which swings from the king-bolt 29 as a center.

In the embodiment hereinbefore set forth it will be noted that the spring posts 17 can swing freely, to a limited extent, in any direction because of the universal joint with the caps 22, except that there will be some friction which will tend to limit this swing. When, however, the lower end of the posts 17 are considered a different action is apparent. The seats 20 remain firm in the yoke 16 and the pins 19 are fixed in these seats 20, but the head 18 is free to shift as to either of these pins. When the axle 4 is radiated by going around a curve, it swings around the king bolt 29 as a pivot, with the result that the posts 17 cease to be vertical. The moment these posts cease to be vertical, one or the other of each pair of pins 19 becomes free and the other pin of the pair carries the load, normally carried by both. This is true even though the movement of the posts 17 from the vertical is not sufficient to be apparent.

As soon as the single pins 19 carry the load as above described, a tendency to return to the vertical is produced which is equal to the weight carried by each pin 19 multiplied by the versed sine of the angle formed by the axis of the post 17 and a line drawn from its center of oscillation to the axis of the pin 19 which carries the load divided by the vertical distance between the center of oscillation of the post 17 and the axis of one of its pins 19. As the weight of the car body is very great; say several tons, this tendency to return to the normal is very strong, and is so great as to practically prevent all oscillation. It is obvious that if this distance between the axes of each of the pins 19 and the posts 17 were unduly increased, the shifting could not take place with the result that the radiating effect would be lost. If this distance were reduced to practically zero the axes would radiate, but there would be nothing to prevent the oscillating of the links 17 in the caps 22 and this swinging would produce the undesirable effect that it is the object of the invention to avoid.

A correct description of the function of the posts 17 and the pins 19 connected therewith is set forth in the said Adams and Head application, Serial No. 581,382, filed September 10, 1910, so that it is unnecessary to repeat here what is said there.

In Figs. 7 to 12 inclusive is shown a king bolt 46 which is so mounted in the frame 2 of the truck as to permit of a slight but universal movement of the axle 4 so that this axle can not only swing from this king bolt 46 in a horizontal plane but also in a vertical, to a limited extent, thus making a more flexible connection between the axle and the frame without introducing play or lost motion in the various joints. In this construction the motor casing 6 is secured to a bracket 47 by bolts or other suitable means and this bracket is in turn secured to a bar 48 which has bolts 49 and blocks 50 and 51 to secure it to a second bar 52 which is shaped substantially as indicated in Fig. 9.

The block 51 is provided with suitable openings 53 which receive suitable bushings 54 in which the king bolt 46 is trunnioned so that it can turn freely about a horizontal axis. Extending from the frame 2 are suitable plates 55 secured by rivets 56 through which extends a pin 57 which passes through the king bolt 46. The pin 57 has a head 58 from which extends a lug 59 that enters a corresponding perforation in the upper plate 55 so that this pin 57 is held securely and cannot revolve about its axis. The lower plate 55 is suitably recessed to permit the brackets 30 to extend through the same to carry the brake-rigging 32, as described above. From the foregoing it is evident that because of the double pivoting of the king-bolt 46, as above described, with two axes, one at right angles to the other, the axle 4 can swing in any direction for a limited extent from one or another of the axes to the king-bolt 46 of both.

In the structure shown in Figs. 13 to 16 inclusive, the same result is accomplished in another way. Here the bar 52 is separated from the bar 48 by a suitable spacing block 60 which has bolts 49 which also secure a plate 61 from which extends a lug 62 with a spherical head that is adapted to engage a socket 63 which is fixed to the frame 2 of the truck by means of suitable bolts 64. The socket 63 has suitable brasses 65 and 66 which fit the interior of the same and form between them a spherical seat. The brasses 66 are made in two parts so as to be readily placed about the lug 62. The neck of the lug 62 has a limited movement in the opening of the brass 66 so that the spherical head turns freely in the socket 63 within the necessary limits.

In the structure shown in Figs. 17 to 21 inclusive the spring posts 17 are slightly changed at their lower ends. In this embodiment of my invention the upper ends of the spring posts are severed, the same is shown in Fig. 1 so that further description is unnecessary. The form of the brass and socket forms in the upper end of these posts and the manner in which they rest upon the springs 23 are slightly changed but the differences are not material. However, the lower ends of the posts 17 are different. Here the lower ends of the posts 17 have bifurcated heads 67 have pins 68 secured therein and connecting the two bottom portions which receive a block 69 with suitably enlarged openings 70 and trunnions 71 which are adapted to be placed and turning freely in the saddles 72 which rest against the lower yoke 16 or secured thereto in any suitable manner or, if desired, as shown in Fig. 21 the saddles 72 may be dispensed with and suitable lugs 73 formed on the bottom of the yoke 16 may receive the trunnions 71.

In Fig. 21 is also shown a guide 74 fixed to a cap 75 on a spring 43 which serves as a guide for the top cord 42 so as to guide said cord in a vertical direction and hold the same true on the truck.

In Figs. 22 to 24 inclusive is shown a further modification; in this structure the post 17 is the same as before at its upper end but its lower end is provided with a spherical surface 76 which engages a suitable seat 77 that is adapted to rest in the lower end of the bore which passes through the lower yoke 16. This gives the rod 17 a universal joint with regard to the yoke 16 and the friction of the seat 77 on the surface 76 is sufficient to prevent any undue amount of swaying. It also permits a very flexible connection between the posts 17 and the yoke 16 and in this respect is equally the same as the connection shown in Figs. 17 to 21 inclusive except that in this latter construction the resistance to oscillation is the same as that explained with regard to the structure shown in Fig. 1. The trunnion 71 presented a more flexible connection than is possible in the construction first above described in which no provision is made other than the springs, for the vertical movement of the frame 2 of the truck. It will be noted that the trunnions 71 rest in bearings which are open at the bottom so that these trunnions can to some extent, at least, leave their seats should it be necessary for them so to do.

What is claimed is:

1. In a truck of the class described, a motor casing and means for mounting the same at one end on the axle of a truck, bars secured to said casing, a ball with a neck thereon secured to said bars, a truck frame and a socket secured to said frame and connected to said ball.

2. In a truck of the class described, an axle, wheels on said axle, a motor casing sleeved on said axle, bars secured to said motor casing, a ball with a neck secured to said bars, a truck frame, a socket composed of a casing and lining, secured to said frame and engaging said ball.

3. In a truck of the class described, a frame, a socket on said frame composed of a casing bearing blocks in said casing, a ball engaging said bearing blocks and means for connecting said ball to a motor casing, and a motor casing and means for supporting another portion of said motor casing so that the same will be supported at one end by said socket and at the other end by said means.

4. In a truck of the class described, a frame, a yoke secured to said frame, openings in said yoke, seats in said openings trunnions in said seats, blocks secured to said trunnions with openings in said blocks, posts with bifurcated lower ends straddling said blocks, pins connecting said lower ends and said blocks and passing through said enlarged openings and means for supporting the upper end of said posts from axle boxes, axle boxes and means for supporting the same.

5. In a truck of the class described, a block composed of trunnions connected by an intermediate portion with elongated openings therein with cylindrical upper surfaces.

6. In a device of the class described, a spring post with a bifurcated lower end connected by pins, a block which said lower end straddles and suitable perforations through which said pins pass, trunnions on said block and seats for said trunnions.

7. In a device of the class described, a spring post with bifurcated lower end, pins connecting the same, a block straddled by said lower end and having suitable perforations for the passage of said pins, trunnions on said blocks, seats for said trunnions and a yoke carrying said seats.

Signed at the city of Philadelphia, county of Philadelphia and State of Pennsylvania.

ARTHUR F. H. HEAD.

Witnesses:
   HENRY C. ESLING,
   H. RADZINSKY.

Copies of this patent may be obtained for five cents each, by addressing the "Commissioner of Patents, Washington, D. C."